(12) United States Patent
White et al.

(10) Patent No.: US 9,044,119 B2
(45) Date of Patent: Jun. 2, 2015

(54) RESERVOIR LEVEL SENSING

(71) Applicant: Breville Pty Limited, Botany, NSW (AU)

(72) Inventors: Gerard Andrew White, Darlington (AU); Ze Kang Lai, Glenfield (AU); Daniel Serra, Flemington (AU)

(73) Assignee: Breville Pty Limited, Alexandria, New South Wales (AU)

( * ) Notice: Subject to any disclaimer, the term of this patent is extended or adjusted under 35 U.S.C. 154(b) by 308 days.

(21) Appl. No.: 13/672,667

(22) Filed: Nov. 8, 2012

(65) Prior Publication Data
US 2013/0087049 A1    Apr. 11, 2013

Related U.S. Application Data

(62) Division of application No. 12/665,327, filed on Dec. 22, 2009, now Pat. No. 8,327,753.

(51) Int. Cl.
A47J 31/00    (2006.01)
A47J 31/56    (2006.01)
A47J 31/06    (2006.01)

(52) U.S. Cl.
CPC ........... *A47J 31/56* (2013.01); *A47J 31/061* (2013.01); *A47J 31/0605* (2013.01)

(58) Field of Classification Search
CPC ...... A47J 31/0605; A47J 31/061; A47J 31/56
USPC ................ 99/299, 283, 282, 280, 307, 285
See application file for complete search history.

(56) References Cited

U.S. PATENT DOCUMENTS

| 5,511,465 | A  | * | 4/1996 | Friedrich et al. | 99/286 |
| 6,526,872 | B2 | * | 3/2003 | Wong | 99/282 |
| 6,575,081 | B2 | * | 6/2003 | Kanba et al. | 99/299 |
| 7,377,162 | B2 | * | 5/2008 | Lazaris | 73/313 |
| 7,717,026 | B1 | * | 5/2010 | Lassota | 99/283 |
| 7,980,422 | B2 | * | 7/2011 | Lassota | 222/23 |
| 2010/0166928 | A1 | * | 7/2010 | Stamm et al. | 426/435 |

* cited by examiner

*Primary Examiner* — Reginald L Alexander
(74) *Attorney, Agent, or Firm* — Molins & Co. Pty. Ltd.

(57) ABSTRACT

A coffee machine has a single serve function that utilizes a reservoir level sensing mechanism so that a single serve dose of water can be dispensed into the grounds regardless of the water level in the machine's reservoir.

17 Claims, 10 Drawing Sheets

RESERVOIR LEVEL SENSING

FIELD OF THE INVENTION

The current technology pertains to mechanisms for sensing liquid levels within a liquid reservoir.

BACKGROUND OF THE INVENTION

Reservoirs may be provided in some items or appliances such as coffee or tea makers. In some instances it may be desirable to gather information for use in an appliance's process controls. For example, it is possible to achieve useful dosing of coffee grounds in a drip coffee maker or brew parameters, if the water reservoir level, and hence the volume of coffee to be brewed, is known prior to brewing.

For reservoirs used within devices such as coffee makers, the level sensing may be achieved during or before the water is heated.

The Applicant's Australian Provisional Application No. 2007900705 and PCT Application No. PCT/AU2008/000187 are hereby incorporated by reference.

OBJECTS AND SUMMARY OF THE INVENTION

It is an object of the current invention to measure the liquid level within a reservoir.

It is also an object of some of the embodiments of the current invention to provide a level sensing mechanism that works by measuring temperature of an outlet of a heating mechanism.

It is a further object of some of the embodiments of the current invention to provide a level sensing mechanism that makes use of the conductivity of water.

It is also an object of the invention to provide a device for measuring the liquid reservoir within a reservoir utilising a pivoting float mechanism and optical sensors for measuring the angular displacement of the float.

It is an object of preferred embodiments to provide a coffee machine having a single serve function that utilises and internal level sensing mechanism so that a single serve dose of water can be dispensed into the grounds regardless of the water level in the machine's reservoir.

BRIEF DESCRIPTION OF THE DRAWING FIGURES

FIG. 5 (a) is a schematic view showing the water tank and the optional calibration plates;

FIG. 5 (b) is a schematic view showing the water tank and the optional calibration plates in another embodiment;

FIG. 5 (c) is a schematic view showing the water tank and the optional calibration plates located below the water tank;

FIG. 5 (d) is a schematic view showing the water tank and the optional calibration plates in another embodiment;

BEST MODE AND OTHER EMBODIMENTS OF THE INVENTION

In a beverage brewer such as a drip tea or coffee maker, water level measurement (or level "sensing") is desirable, because the dosing of coffee grinds or other process variables can be adjusted according to the water or brew volume. Level sensing may be provided in other appliances or devices where liquid level sensing is useful.

In one embodiment that is suitable for use in drip coffee devices, the level sensing mechanism cooperates with the heating mechanism in the brewer. The water level, and hence the water volume, can be determined by monitoring the change in the temperature of water discharged from the heating mechanism.

Figure 1:
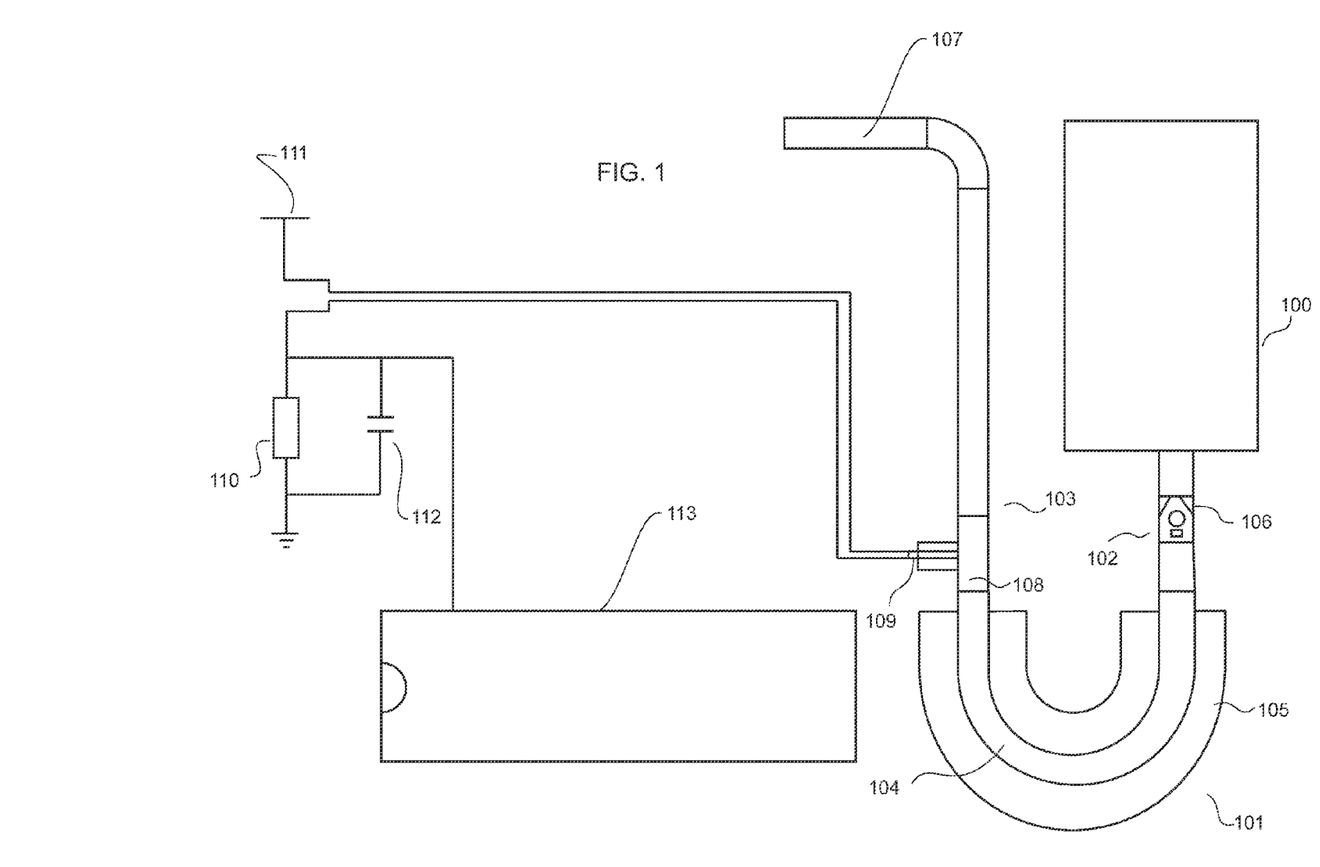
FIG. 1 is a schematic of a first embodiment of the level sensing mechanism where a thermistor is used.

As shown in FIG. 1, water is released from the reservoir (or "tank") 100 into a horizontal C-shaped heating and pumping mechanism 101. The heating mechanism comprises an input end 102, an output end 103, and a C-shaped water pipe 104 between the two ends. The pipe 104 is fully or partially surrounded by a heating element 105.

A one-way check valve 106 is provided below the reservoir 100 at the input end 102. The check valve 106 is opened by the water pressure (or "water head") from the reservoir 100. The top of the water reservoir is preferably no higher than the water spout 107. This creates optimal back pressure on the pump and heater 101 and thwarts leakage. Because of the one-way valve 106, boiled water and steam can only be discharged from the mechanism's output end 103 toward the boiled water spout 107. In this way, the heating mechanism 101 pumps boiled water toward the spout 107.

The expulsion of boiled water from the spout 107 allows water from the reservoir to replenish the pipe 104. As the water level in the tank 100 decreases, the water head decreases. Decreasing pressure is thus exerted on the valve 106. The valve 106 in turn allows less water to replenish the pipe 104 during each cycle. This causes an ever smaller temperature drop at the pipe's output 103, compared to the temperature drops recorded at the beginning of the brew process. Therefore, by monitoring the variation in water temperature at the pipe's output end 103 over a relatively short period of time, it is possible to determine the water level. The temperature data that is recorded over a number of cycles (say ten) can be analysed to provide a useful indication of the reservoir volume. in one embodiment, early readings are compared to later readings, and the water level is deduced from the comparison.

For this purpose, a T-junction 108 is provided at the pipe output 103 for the mounting of a thermistor 109 or another electronic sensor. The microcontroller starts performing calculations to determine the water level when the temperature at the T-junction 108, as measured by the thermistor 109, reaches boiling point for the first time. A resistor 110 is connected in series with the thermistor 109. Together the resistor no and the thermistor 109 act as a voltage divider for a common voltage supply 111. The voltage drop across the thermistor 109 can be calculated by measuring the voltage across the resistor 110. In some embodiments, a capacitor 112 is further connected in parallel to the resistor no to minimize the effects of noise. The microcontroller 113 then uses the voltage data, measured over a short period of time, to determine the temperature drop at the T-junction, and to determine the corresponding water level.

Figure 2:
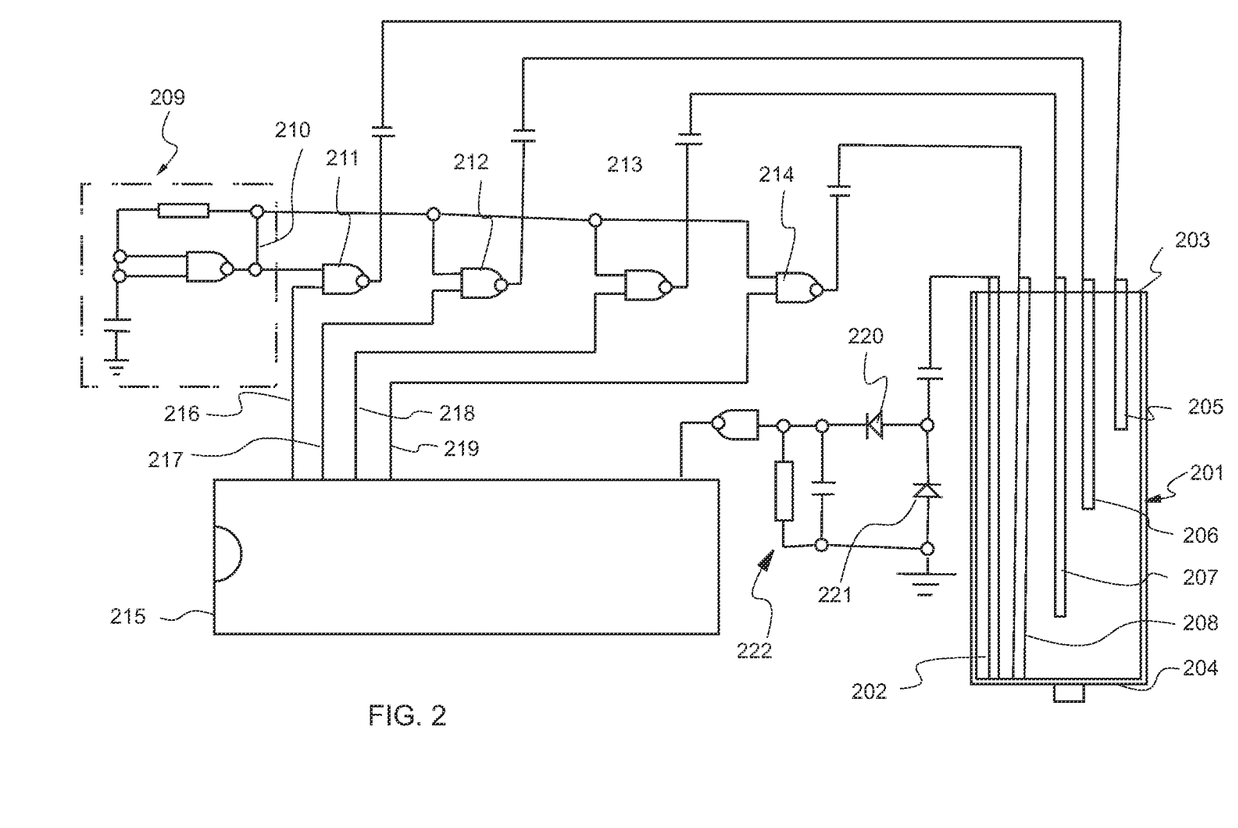
FIG. 2 is a schematic of a second embodiment of the level sensing mechanism, where electrically charged rods are used.

In further embodiments, the level detection mechanism does not cooperate with any heating mechanism. As shown in FIG. 2, level detection is achieved using parallel charged rods that are provided within the reservoir 201. A detection rod 202 extends from the top 203 and reaches toward the bottom 204 of the reservoir. In this example four level rods 205, 206, 207, 208 extend down to various depths within the reservoir. The longest level rod 208 may extend to a predetermined minimum water level required for the relevant application. For example, in the case of drip coffee makers, this minimum level may be the level needed for one cup of coffee (or fractions, if required). One of the level rods 208 is also an optional "empty" rod that reaches to reservoir bottom 204. The charged rods provided allow the detection of an empty reservoir, and of three different non-empty reservoir levels. In other embodiments, more rods may be provided for level detection with a higher resolution.

The charged rods, except for the voltage detection rod 202, receive electrical wave forms from an oscillating circuit formed by a gated RC circuit 209. Preferably parameters are chosen to achieve a frequency of between 50 and 60 Hz for this circuit. A wider range of frequency, from 50 Hz to 500 Hz or higher, may be used.

The oscillating circuit's output (the "electrical signal") 210 is sent to the gates 211, 212, 213, 214, each gate being connected to one level rod. The microcontroller 215 supplies the additional control inputs 276, 217, 218, 219 to the gates. The gate receiving the required control signal from the microcontroller allows the output 210 to propagate toward the corresponding level rod. The microcontroller thus exerts control over which level rod receives the electrical signal. Water, provided it reaches or exceeds the minimum required level, conducts the electricity from the rod that receives the signal to the detection rod.

The electrical current, if any, from the detection rod, travels to a voltage detection circuit 222. In this example the voltage detection circuit 222 is a parallel RC circuit with the same frequency as the oscillating circuit 209. The output from the detection circuit 222 in turn travels to the microcontroller 215. In some embodiments, capacitors may be included between the gates and the corresponding level rods, or between the detection rod and the detection circuit, to minimize unwanted noise. In this example, diodes 220, 221 are included in the detection circuit 222, so that the microcontroller receives rectified data. There may further be a logic gate, such as a NOT gate, provided between the output of the detection circuit 222 and the microcontroller 215. The gate ensures that a standard voltage level is read by the microcontroller 215.

The conductivity of water enables the connection between a level rod currently conducting electricity and the detection rod. Otherwise, an open circuit is formed between this level rod and the detection rod. By sending electrical current to the level rods and reading the corresponding detection rod signals successively, the microcontroller can determine the water level. In preferred embodiments, the rods are "self-cleaning" because alternating current is used. In embodiments where direct current is used, for the rods to be self-cleaning, the detection process is performed once with a direct current of a first polarity, and then again with a direct current of the opposite polarity.

In other embodiments, level detection may be achieved using a rod and tube arrangement. In the example shown in FIG. 3, the level sensing mechanism measures the overall resistance of water between a stainless steel rod 301 and a stainless steel tube 302 that surrounds the rod 301. Both the rod 301 and the tube 302 are situated within the water tank 303, to determine water level.

Figure 3:
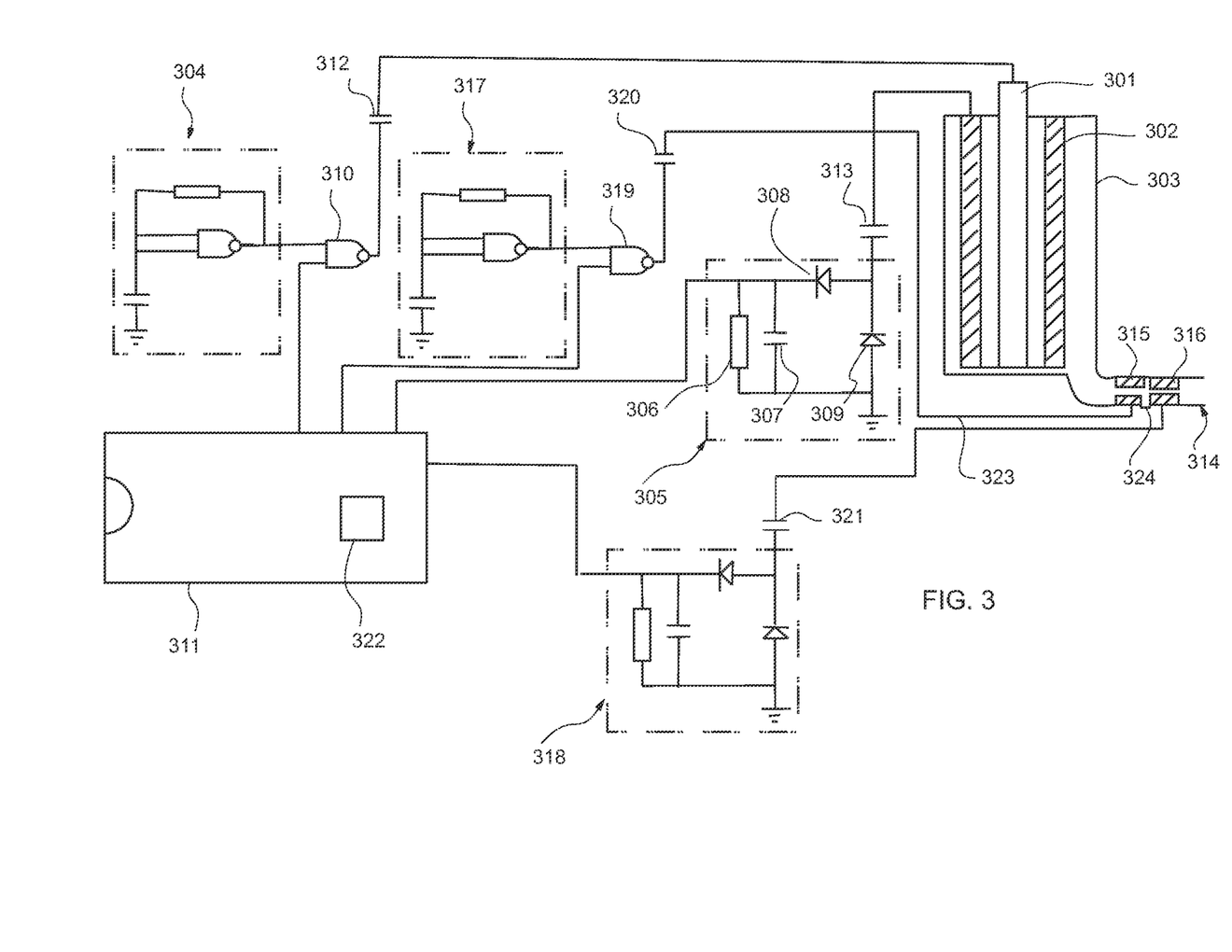
FIG. 3 is a schematic of a third embodiment of the level sensing mechanism that includes water hardness calibration.

Referring to FIG. 3, the rod and tube arrangement spans the entire water level range where level sensing is required, but does not reach the bottom of the tank. For the rod and tube arrangement to reach the bottom of the tank 513, through holes 514 need to be provided along the tube 515 so that water may enter the space between the tube and the rod 516 (see FIG. 5(d)). The rod 301 and the tube 302 may be made of another material, as long as the material is conductive. The rod 301 is electrically connected to a signal generating circuit (or "signal generator") 304. In this example the signal generator 304 is a gated RC circuit that generates 5 volt square waves at 50 to 60 Hz, but circuits generating other wave forms or amplitudes, or at other frequencies, may be selected. Frequencies of between 50 Hz and 500 Hz and higher may be used. The tube 302 is connected in series with a water level detection circuit 305. The detection circuit 305 comprises a resistor 306 that, along with the rod and tube arrangement, form a voltage divider. There may further be a capacitor 307 connected in parallel with the resistor 306, to reduce the effect of high frequency noise. Diodes 308, 309 may further be provided to rectify the voltage level across the detection circuit 305.

The output from the signal generator 304 to the rod 301 is switched on or off by an input logic gate 310 that receives control signals issued by the microcontroller 311. Under the command of this microcontroller 311, electrical wave forms from the signal generator 304 are sent to the rod 301. A capacitor 312 may be provided between the input logic gate 310 and the rod 301, to minimize artefacts such as residual direct current signals. A series capacitor 313 may similarly be provided between the tube 3o2 and the detection circuit 305.

At water levels below rod 301 and tube 302 arrangement, there is an open circuit between the rod 301 and the tube 302. As the water level increases, a greater portion of the space between the rod 301 and the tube 302 becomes filled with water, lowering the resistance between the rod and the tube and increasing the voltage level measured across the detection circuit 305. This measured voltage level used by the microcontroller 311 determines the water level.

The conductivity of water depends on factors including water hardness and temperature. These factors can differ depending on, for example, the user's location, the weather, or the time of day. Therefore, in preferred embodiments, a calibration circuit is included to calibrate the water conductivity used in the microcontroller's calculations.

As shown in FIG. 3, the water fill-tube 314 comprises two short conductive pipes or sections 315, 316 that are located below the bottom 323 of the water tank 303. The pipes 315, 316 are long enough, and are separated from each other by a gap that is small enough, for the conductivity between the pipes to be non-trivial compared to noise fluctuation. Here the tube portion 324 between the pipes 315, 316 is not electrically conductive. Other arrangements such as plates or pins may be used in stead of plates. One of the pipes 315 is in series with a calibration signal generator 317 having the same layout as the level detection signal generator 305. The calibration signal generator is controlled by the microcontroller 311 in the same fashion as the level detection signal generator 305. A calibration detection circuit 318 is similarly provided between the microcontroller 311 and the second calibration pipe 316.

The microcontroller 311 switches the detection signal on or off, by sending controlling signals to the calibration control gate 319. Electrical wave forms from this gate 319 enter the first pipe 315 and are conducted into the second pipe 316 by water. Again, there may be a capacitor 32o between the calibration logic gate 319 and the first pipe 315, or a capacitor 321 between the calibration detection circuit 318 and the second pipe 316, or both, for reducing artefacts such as none-zero direct current voltage levels.

The microcontroller 311 monitors the voltage drop across the pipes by monitoring the voltage across the detection circuit 318, and calculates water conductivity. The two analogue voltage signals, one from the level detection circuit 305, and the other from the calibration detection circuit 318, are converted into discrete water levels, by analogue to digital converters 322 in the microcontroller 311.

Figure 4:
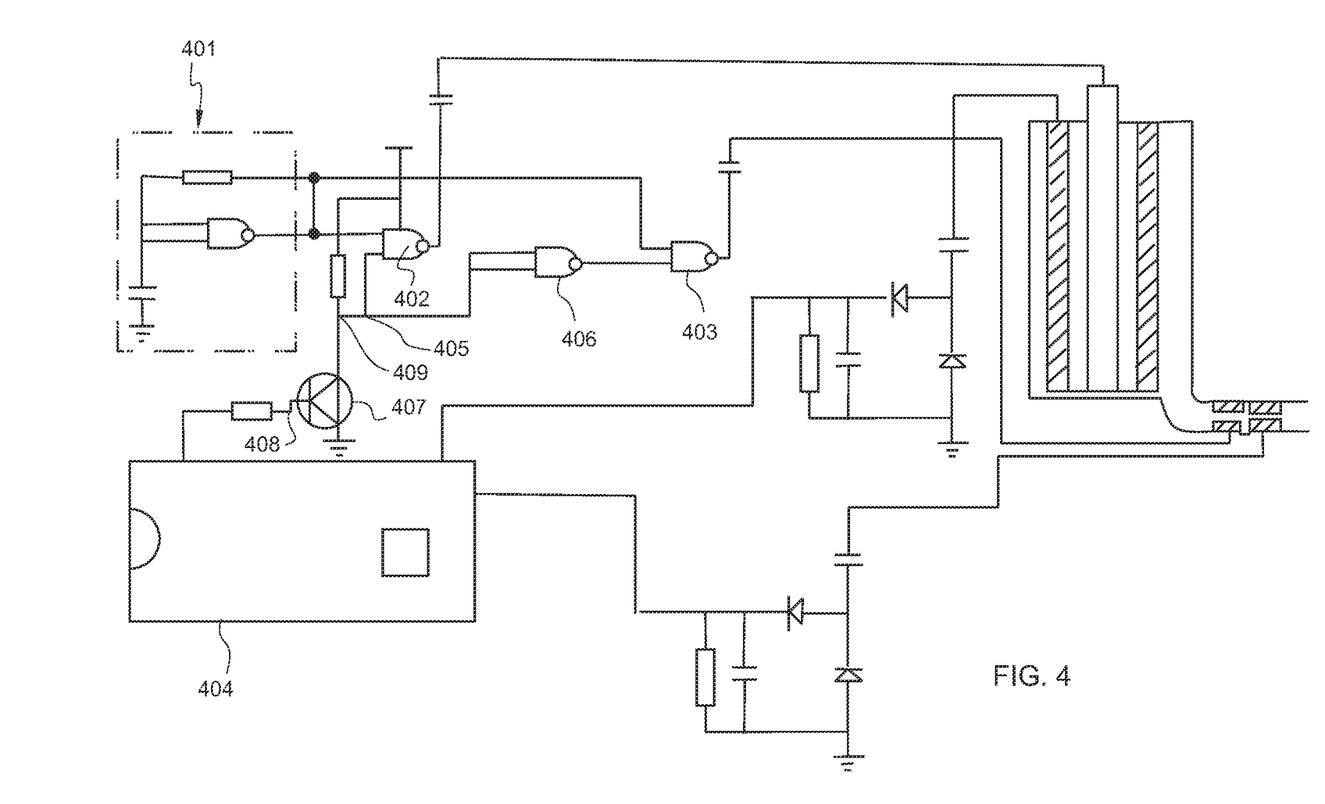
FIG. 4 is a schematic of a fourth embodiment of the level sensing mechanism that includes water hardness calibration.

In the example shown in FIG. 4, the control circuitry is simplified by using one single signal generator 401 for both water level detection and water conductivity calibration. Here the output of the signal generator 401 is connected to both the level detection logic gate 402 and the calibration logic gate 403, each of which being under the command of the microcontroller 404.

Another simplification may be achieved by reducing the number of microcontroller inputs for both the level detection and water conductivity calibration. For example, one control input 405 is sent to the level detection logic gate 402. The same control input 405 is negated by what is effectively a NOT gate 406 and then used by the calibration logic gate 403. Here negation means a reversal between the low and high levels of the control input 405. The control input is negated because calibration and water detection are performed at different times.

The microcontroller 404 has a first working voltage, and the NOT gates 402, 406, 403 have a second working voltage. In this embodiment the first and second working voltages are 5 and 12 volts, respectively. In embodiments where the first and second voltages differ, the microcontroller 404 output may be connected to a transistor 407 which relays the microcontroller's working voltage to the working voltage of the logic gates. The transistor 407 operates in the saturation zone. Here the microcontroller 404 output is connected to the transistor's base 408, and the logic gates 402, 403 are connected to the transistor's collector 409.

Simplifying circuitry allows the inclusion of other circuitry for further functionality, such as heat protection or water temperature related operations, or the control for brewing mechanisms, such as those using water hardness as an input.

Figure 5:
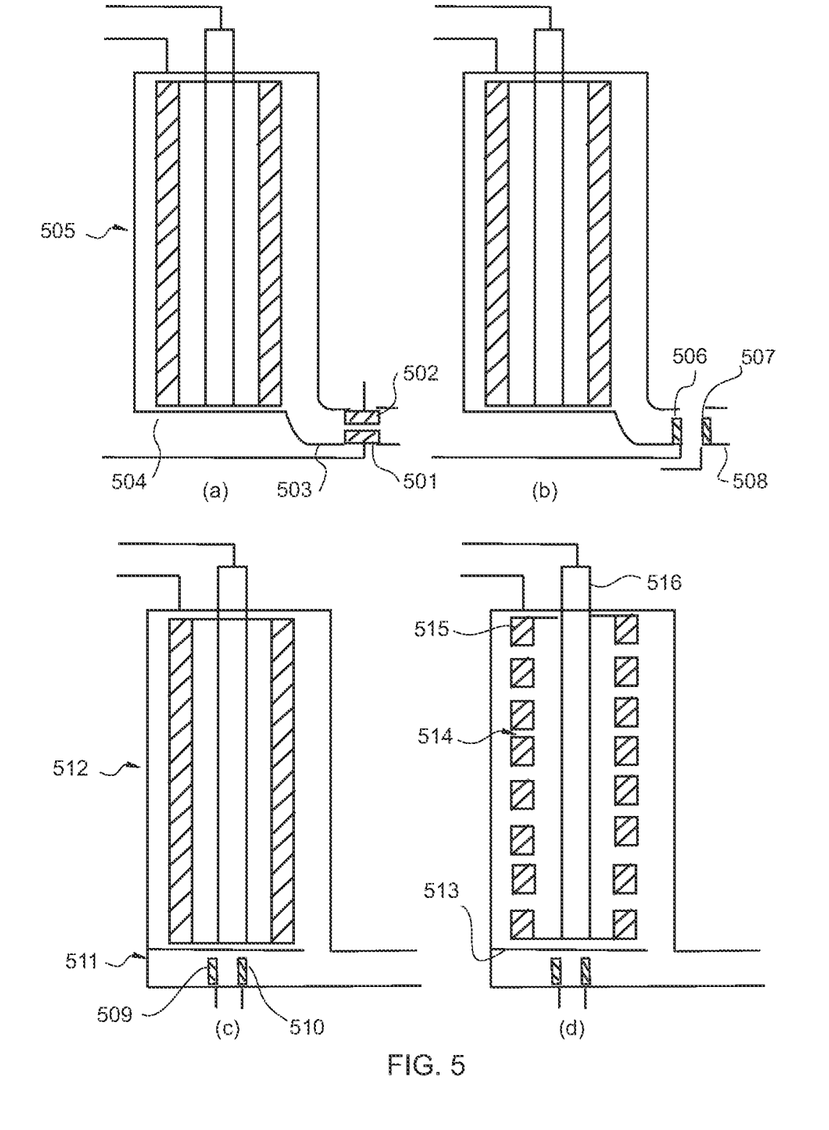

In embodiments of the types shown in FIGS. 3 and 4, the calibration pipes are located within the fill-tube (i.e. "inline"). In other examples, plates may be used instead of pipes for calibration, or the calibration pipes or their functional equivalents may be placed below the main body of the water tank. For example, in FIG. 5 (*a*) calibration plates 501, 502 are placed within the fill-tube 503 located below the bottom 504 of the water tank 505. Other layouts of the plates may be possible. One example is shown in FIG. 5(*c*) where the plates 506, 507 are placed side by side, each plate being large enough and separated by a distance small enough for the reliable measurement of water conductivity between the plates. The plates are not so large that they block the water flow in the fill-tube 508. In the example shown in FIG. 5 (*c*), the calibration plates 509, 510, or their functional equivalents, are placed in a calibration compartment 511 below the water tank 512. The water tank 512 does not begin to be filled until the calibration compartment 511 has been filled.

In a coffee maker having the type of level detection mechanism shown in FIGS. 3 to 5, the microcontroller may be further programmed to include a reference such as a look up table that tabulates the relationship between detection signals and the optimum coffee dosing, in the case of drip coffee makers. In further preferred embodiments, the look up table may also include the correlation between detection signals and the rates at which the water flows into the brewer, and the corresponding dosing requirements.

Figure 6:
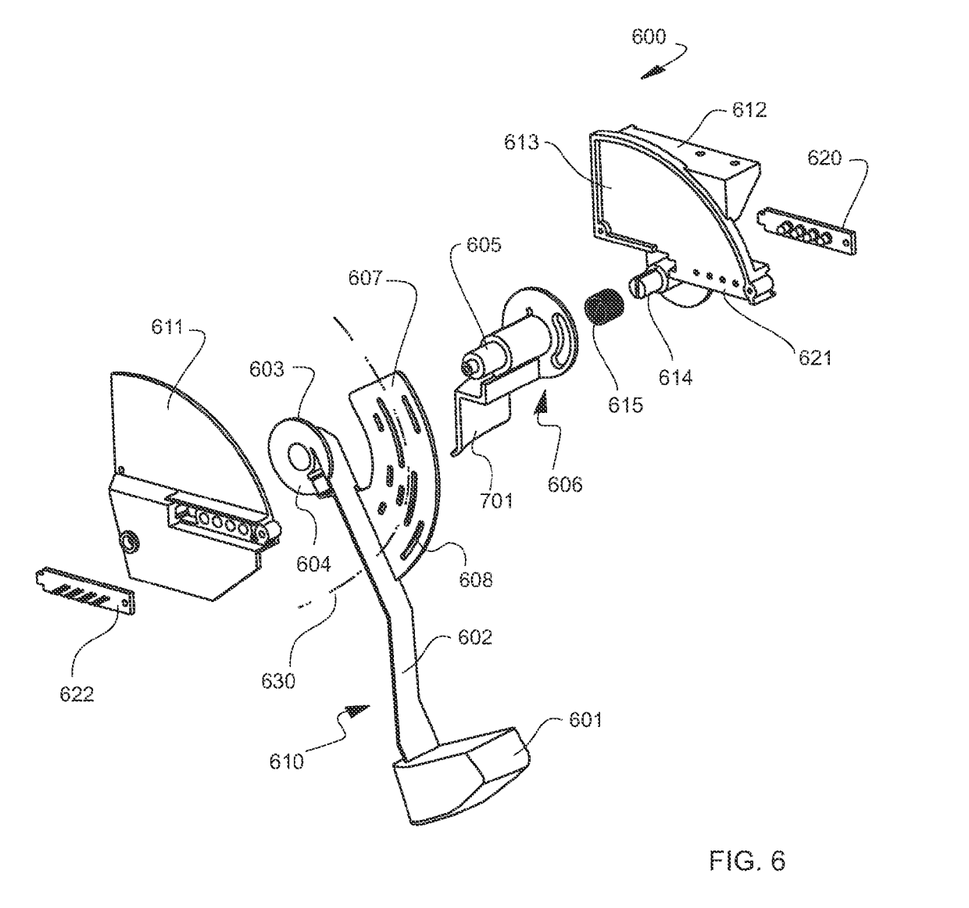
FIG. 6 is an exploded perspective view of a reservoir level sensor that utilised optical sensors.

An alternate reservoir level detection mechanism or sensor 60o is depicted in FIG. 6. As illustrated, the float mechanism 610 comprises a float 601 affixed to one end of a pivoting float arm 602. The pivot end 603 of the float arm comprises a bushing 604 that rotates about a stub shaft 605 that is carried by a float rotation actuator 606. An arc shaped blade 607 is attached to the float arm 602 adjacent to the pivot end 603. It has various arc shaped slots 608 formed in it. The slots 608 are preferably arranged along different radii of rotation 63o and are generally indicative of different degrees of rotation of the float arm around the stub shaft 605. In this example 12-16 different reservoir levels can be determined using only four radii 630 on which to form the slots 608. The housing is adapted to receive light emitters 620 such as an array of LED lights. In the example of FIG. 6, the LED lights are four in number and arranged, equally spaced, in a straight line. The light emitters 620 are aligned with cooperating openings 621 formed through the housing portion 612. The lights transmit through the openings 612 and impinge on the blade or fin 607. Depending on the radial orientation of the float assembly 610, different patterns of light reception are measured by optical receivers or sensors 622 located on the other housing portion 611. Thus, rotation of the float assembly 610 can be measured by the four light receivers or sensors 622 to provide an indication of the number cups or volume of water in the coffee machine's reservoir. In any given orientation of the float mechanism, the illumination pattern on the four sensors 622 describes a binary code that is representative of one of the discrete levels that can be measured. Thus, the pattern of slots in combination with the four sensors 622, gives 42 or a maximum of sixteen permutations, each one capable of representing an arc of rotation of the float mechanism and thus a distinct and discrete level. The output of the light receivers or sensors 622 is provided as an input to the coffee machine's processor or MCU.

Figure 7:
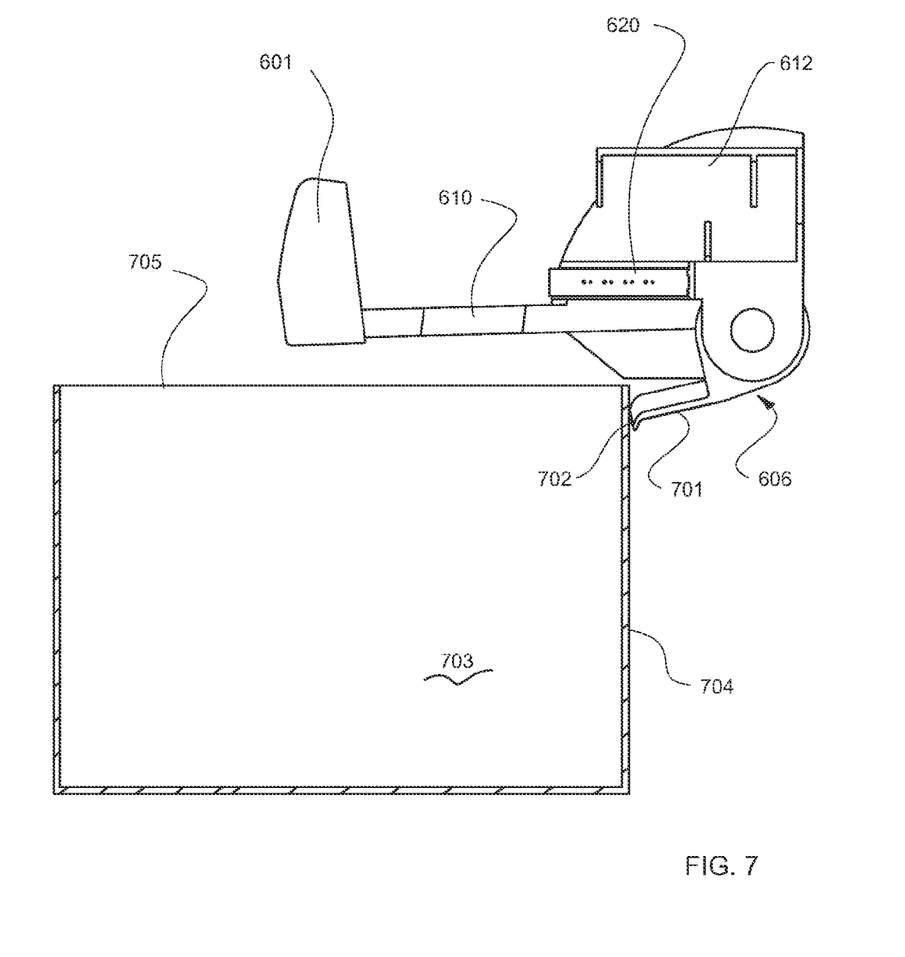
FIG. 7 is a schematic side elevation of a sensor and reservoir.
Figure 8:
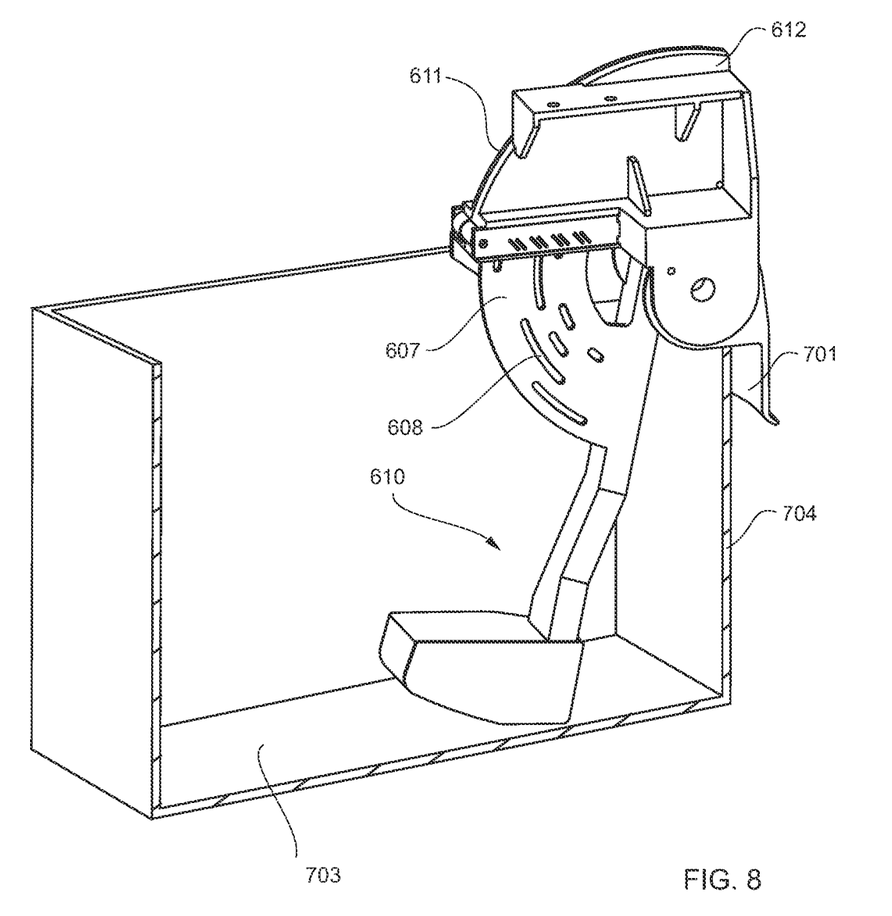
FIG. 8 is a perspective view, partially cross sectioned of the sensor and reservoir of FIG. 7, showing the fully installed position of the reservoir.

As suggested by FIGS. 6, 7 and 8, the float rotation actuator 606 and the float assembly 610 are partially contained within a housing 611, 612. One portion of the housing 612 comprises a protective enclosure 613 for the slotted blade 607 and has a second stub shaft 614 that is received by a central bore of the float rotation actuator 606. A torsional spring 615 is interposed between the housing portion 612 and the float rotation actuator. The spring 615 serves to counteract the affect of gravity and lift the float 601 out of the reservoir by rotating the float rotation actuator 606 when the reservoir is removed from the coffee machine. As shown in FIG. 7, the float rotation actuator 606 further comprises a lever 701 having a rounded or radiused distal end 702. When the coffee machine's removable water reservoir 703 is withdrawn from the coffee machine, its side wall 704 ceases to impinge on the lever 701 and consequently, the spring 615 acts to rotate the float assembly 610 into its uppermost position as depicted in FIG. 7. Note that when the side wall 704 is in close proximity with the lever, the float 601 is located generally above the central part of the open top or mouth 705 of the reservoir 703.

As shown in FIG. 8, full insertion of the reservoir 703 causes the side wall 704 to impinge against the lever 701. This causes the spring torsion to disengage from the float rotation actuator 606 thus allowing the float mechanism 610 to descend under the influence of gravity into the interior of the reservoir 703. In this orientation, the float mechanism is free to pivot or rotate about the float rotation actuator's stub shaft 605. Light from the emitters 62o will then pass selectively through the slots in the blade 607 and be detected by the sensors 622 depending on which slots 608 the individual beams are able to pass through. The resulting reception pattern as detected by the receivers or sensors 622 will then be sent as a signal to the coffee machine's MCU. Subsequent withdrawal of the reservoir 703 allows the lever 701 to rotate and lift the float assembly 610 into the position depicted in FIG. 7.

Figure 9:
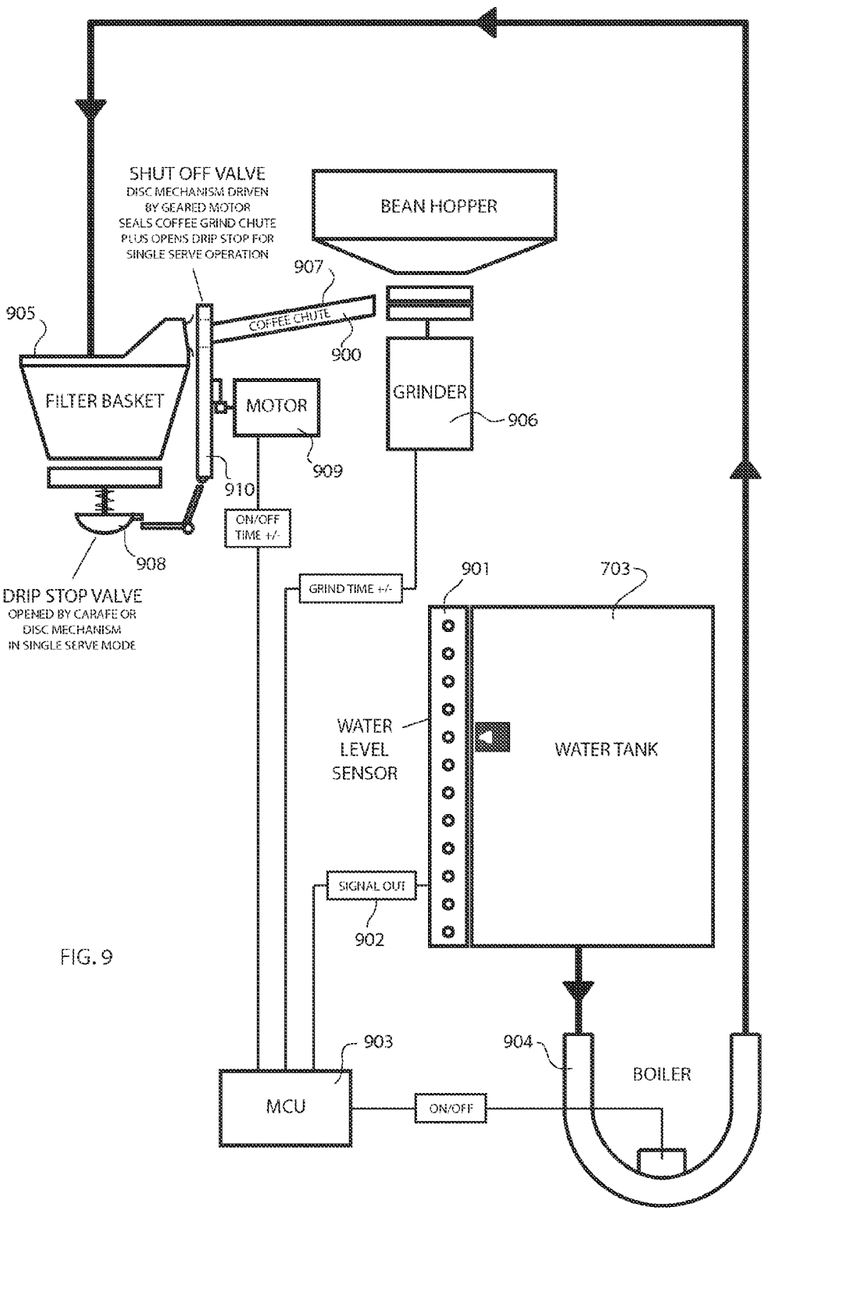
FIG. 9 is a schematic diagram illustrating the interrelationship between a coffee maker's single serve mechanism and the reservoir's level sensor.

As illustrated by FIG. 9, a coffee machine with a single serve setting can benefit from the aforementioned teachings in respect of water level sensing or sensing and level detection mechanisms. In a coffee machine of the kind disclosed in the Applicant's co-pending PCT application PCT/AU2008/000187, the removal of the machine's carafe will generally cause the machine's drip stop valve to close. The closing of the drip stop valve is useful in thwarting unwanted dripping from the filter basket but required either manual of mechanical intervention in order to allow a single serve of coffee to be dispensed in to a cup or mug that, unlike a carafe, is not adapted to engage with and thus open the drip stop valve. In accordance with the teachings of the present invention, the level detection mechanisms of the present invention are used for the purpose of determining whether or not there is enough water in the reservoir to complete a user specified brewing task (such as dispensing a single serve). The water level sensor may also be used to determine when a particular quantity, such as a single serve quantity of water, has been dispensed into the filter basket.

As shown in FIG. 9, a water level sensor or level detection mechanism 901, for example of the aforementioned types, can be used to produce an output signal 902 to the coffee machine's MCU 903. The MCU 903 is used to send operational power to the coffee machine's boiler/pump 904 and thus, in conjunction with the sensor 901 result in the delivery of a single serve quantity of water into the filler basket 905. In this way, a user can initiate a single serve brew cycle whereby the MCU will operate the coffee machine's grinder 906 to dispense a corresponding single serve dose of ground coffee through a coffee chute 907 into the filler basket 905. After the ground coffee has been dispensed into the filter basket and the appropriate water quantity has been delivered by the boiler/pump 904, the MCU 903 is able to time the delayed opening of the drip stop valve 908 in order to achieve an optimum seeping of the coffee grounds in the hot water prior to being dispensed. When the predetermined steep time interval has expired, the MCU operates the electric motor 909 that causes the drip stop valve 908 to open. This dispenses the brewed coffee into the user's cup or mug. In the particular example depicted in FIG. 9, the motor 909 that operates the drip stop valve is also used to control a disk 910 that acts to seal the coffee grind chute 907 until such time as the freshly ground coffee is dispensed into the filler basket 905. The operation of the grinder 906, chute 907, disk 910 and drip stop valve 908 are disclosed and discussed in the Applicant's aforementioned co-pending PCT Application No. PCT/AU2008/000187.

Figure 10:
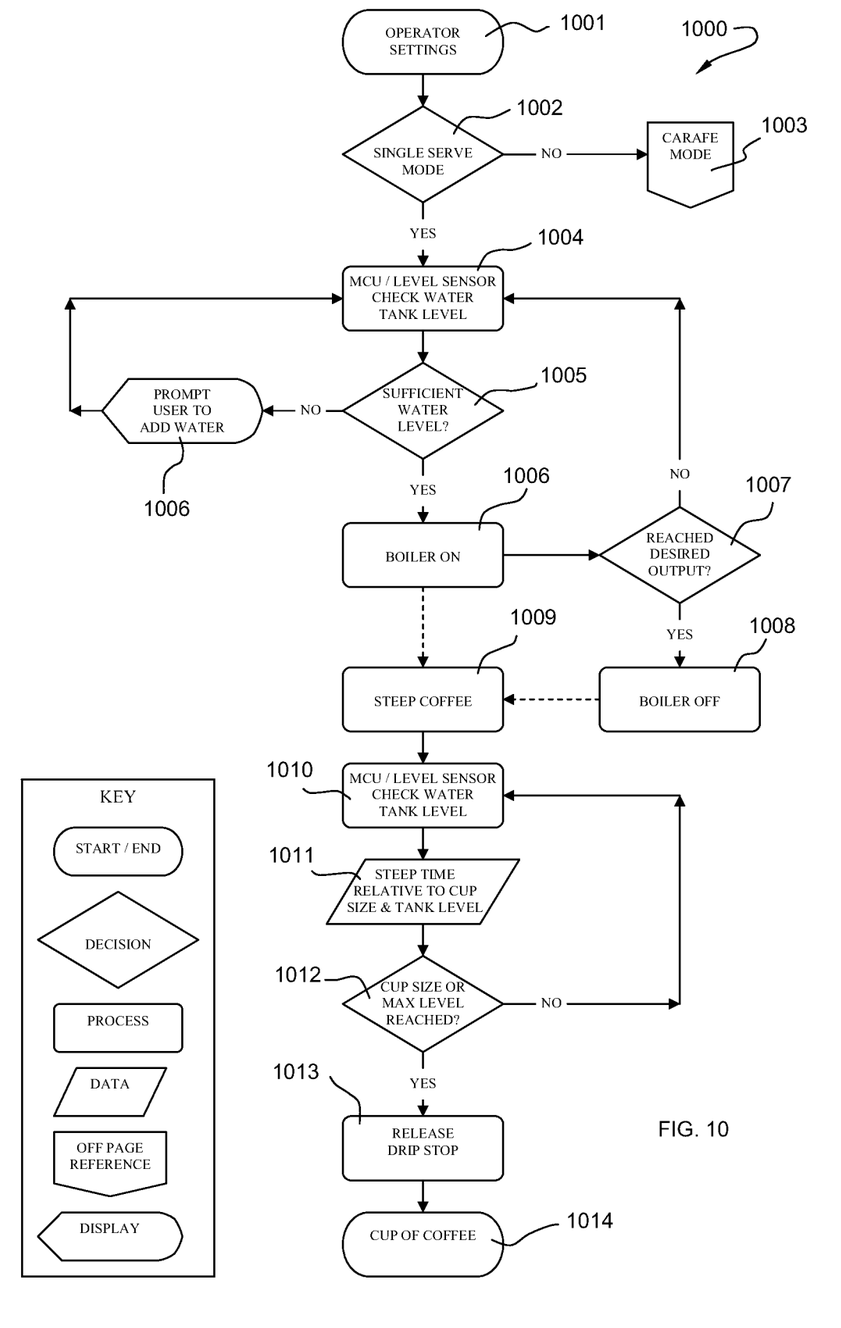
FIG. 10 is a flow chart illustrating the process steps associated with a coffee machine's single serve mechanism, as integrated with an internal reservoir level sensor.

A flow chart illustrating the aforementioned single serve brew methodology is disclosed in more detail in FIG. 10. As illustrated, the process 1000 begins with user inputting the required preferences and operating settings 1001 through the external controls of the coffee machine. These controls may allow the user to select parameters such as dispensed coffee serving volume, coffee strength and the number of individual serves required, including a single serve. The coffee machine's MCU either receives the appropriate control inputs or interrogates the controls to determine whether or not the user has requested a single serve 1002. If the user has not requested a single serve, the MCU operates in the conventional carafe mode 1003. If the user has requested a single serve, the MCU performs a process that determines the water level in the reservoir 1004. Any appropriate level sensor may be used including those described above. The MCU then determines 1005 whether or not there is enough water in the reservoir to deliver the amount requested by the user. If not, the MCU prompts the user to add water 1006. If there is sufficient water in the reservoir according to the output of the level detection mechanism, the coffee machine's boiler is activated 1006. Operation of the boiler causes a discharge of hot water into the filter basket. The MCU continues to periodically read the level in the reservoir. If the desired output has not been reached 1007 then the process reiterates from the step of checking the water level in the tank 1004. If the desired water output has been reached 1007 then the coffee machine's boiler is turned off 1008. Once the boiler starts to deliver water to the filter basket, the MCU begins a timing operation that determines the amount of time that the grounds are steeped for 1009. (In other embodiments, the steep time may be determined from when the boiler is turned off 1008). The MCU continues to determine the water level in the reservoir using the reservoir level sensor 1010 and compares the delivered volume to the single serve volume requested by the user. In this example the user may use the machine's controls to request on eof four different single serve coffee sizes or volumes, ranging from small cup or demitasse to large mug. If the comparison 1011 requires it, and the MCU determines 1012 that enough water has been dispensed to risk overflowing the filter basket, the MCU sends a command to the motor 909 that operates the drip stop valve 908 to open it. This causes the release of the drip stop valve 1013. Release of the drip stop valve thus causes the steeped coffee in the filter basket to be dispensed into the user's cup or mug 1014. Otherwise, the drip stop is released 1013 when the pre-determined steep time has been reached 1009.

While the present invention has been disclosed with reference to particular details of construction, these should be understood as having been provided by way of example and not as limitations to the scope or spirit of the invention.

What is claimed is:

1. An apparatus for brewing coffee, the apparatus comprising:
    a filter basket adapted to dispense brewed coffee; the filter basket has an output opening with a drip stop valve, such that a presented carafe engages the drip stop valve for opening the drip stop valve;
    a reservoir for supplying water to the filter basket;
    a heating device for heating the water flowing from the reservoir to the filter basket; and
    a microprocessor for receiving user inputs and controlling the operation of the apparatus; an operation of the drip stop valve being controlled by the microprocessor;
    the device has a single serve setting, initiated by a user input, in which an individual serving of coffee is dispensed from the filter basket;
    a release opening of the drip stop valve is delayed by the microprocessor until after a steep time interval has expired; and the microprocessor regulates the steep time interval according to a coffee strength input made by a user; and wherein the drip stop valve can be selectively independently opened by each of insertion of the carafe and control by the microprocessor.

2. The apparatus according to claim 1, wherein:

the reservoir has a level sensor that communicates an output signal to the microprocessor and the microprocessor determines from that signal when a single serving has been dispensed into the filter basket.

3. The apparatus according to claim 1, wherein:

the reservoir has a level sensor that communicates with the microprocessor and the microprocessor determines whether or not there is an adequate supply of water in the reservoir to deliver an individual serving and causes a prompting of the user if there is not.

4. The apparatus according to claim 1, wherein:

the microprocessor regulates the volume of the individual serving according to a coffee serving volume input made by a user.

5. The apparatus according to claim 4, wherein:

the reservoir has a level sensor that communicates an output signal to the microprocessor and the microprocessor determines from that signal when a single serving has been dispensed into the filter basket.

6. The apparatus according to claim 4, wherein:

the reservoir has a level sensor that communicates with the microprocessor and the microprocessor determines whether or not there is an adequate supply of water in the reservoir to deliver an individual serving and causes a prompting of the user if there is not.

7. The apparatus according to claim 4, wherein:

the steep time interval begins when the heating device is turned on by the microprocessor.

8. The apparatus according to claim 4, wherein:

the steep time interval begins when the heating device is turned off by the microprocessor.

9. The apparatus according to claim 4, wherein:

the heating device comprises a heating and pumping mechanism associated with a check valve that is located between the reservoir and the heating and pumping mechanism.

10. The apparatus according to claim 9, wherein:

the microprocessor is used to send power to the heating device in accordance with the output signal.

11. The apparatus according to claim 4, wherein:

the drip stop valve is operated by a motor that is controlled by the microprocessor.

12. The apparatus according to claim 1, the apparatus further comprising:

a coffee grinder;

a chute extending from the coffee grinder to the filter basket;

the microprocessor is used to activate the coffee grinder to deliver a single serve dose of ground coffee into the filter basket before water is dispensed into the filter basket.

13. The apparatus according to claim 12, wherein:

the microprocessor regulates the volume of the individual serving according to a coffee serving volume input made by a user.

14. The apparatus according to claim 13, wherein:

the reservoir has a level sensor that communicates an output signal to the microprocessor and the microprocessor determines from that signal when a single serving has been dispensed into the filter basket.

15. The apparatus according to claim 12, wherein:

a close element is provided that seals the chute until coffee is dispensed into the filter basket.

16. The apparatus according to claim 12, wherein:

a motor controlled by the microprocessor actuates both the close element and the drip stop valve.

17. The apparatus according to claim 16, wherein:

the close element is a rotating disk.

* * * * *